(12) United States Patent
Leu et al.

(10) Patent No.: US 7,039,286 B2
(45) Date of Patent: May 2, 2006

(54) LIGHT GUIDE MODULE HAVING UNIFORM LIGHT DIFFUSION ARRANGEMENT AND METHOD FOR MAKING THE SAME

(75) Inventors: Charles Leu, Fremont, CA (US);
Mi-Chien Chen, Tu-Chen (TW);
Tai-Chen Yu, Tu-Chen (TW);
GA-Lane Chen, Fremont, CA (US);
Michael Lin, Tu-chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 132 days.

(21) Appl. No.: 10/707,162

(22) Filed: Nov. 24, 2003

(65) Prior Publication Data
US 2004/0228109 A1 Nov. 18, 2004

(30) Foreign Application Priority Data
Nov. 22, 2002 (TW) .................................. 91134012

(51) Int. Cl.
*G02B 6/10* (2006.01)
*F21V 7/04* (2006.01)
*G02F 1/1335* (2006.01)

(52) U.S. Cl. ...................... 385/129; 385/146; 385/901; 362/552; 362/558; 362/606; 362/610; 362/618; 349/62; 349/64; 349/65

(58) Field of Classification Search ........ 385/129–131, 385/901, 146; 362/552, 558, 600, 606–610, 362/615, 617, 618, 627; 349/62, 64, 65
See application file for complete search history.

(56) References Cited

U.S. PATENT DOCUMENTS

| | | | |
|---|---|---|---|
| 5,438,484 A | | 8/1995 | Kanda et al. |
| 5,521,797 A | * | 5/1996 | Kashima et al. ............ 362/617 |
| 5,881,201 A | | 3/1999 | Khanarian |
| 6,625,379 B1 | * | 9/2003 | Azuma ........................ 385/146 |
| 6,825,243 B1 | * | 11/2004 | Ohno et al. ................... 522/97 |
| 2004/0066645 A1 | * | 4/2004 | Graf et al. ..................... 362/31 |

FOREIGN PATENT DOCUMENTS

| JP | 08146418 A | * | 6/1996 |
|---|---|---|---|
| JP | 10197725 | * | 7/1998 |

* cited by examiner

*Primary Examiner*—Michelle Connelly-Cushwa
(74) *Attorney, Agent, or Firm*—Wei Te Chung

(57) ABSTRACT

A light guide module (10) for use in a flat panel display (21) comprises a light guide pipe (20) having a light emitting surface (21), and a light incident surface (25) orthogonal to the light emitting surface. A light diffusion arrangement (30) is deployed over the light emitting surface and includes organic scattering balls (31) homogenously mixed within a bonding agent (33). At least a light source (60) is arranged adjacent the light incident surface to project light beams into the light guide module.

12 Claims, 5 Drawing Sheets

LIGHT GUIDE MODULE HAVING UNIFORM LIGHT DIFFUSION ARRANGEMENT AND METHOD FOR MAKING THE SAME

BACKGROUND OF INVENTION

1. Field of the Invention

The present invention relates to a light guide module plate, and more particularly to a light guide module having a light diffusion arrangement over a light emitting surface, thereby providing uniform luminance distribution over the entire light emitting surface.

2. Description of Related Art

A liquid crystal display is capable of displaying a clear and sharp image over a wide area. It is thus used with various devices in which a message or picture needs to be illustrated. However, a liquid crystal itself does not emit light, therefore, it has to be back-lit by a light source to display the messages and/or pictures shown there.

In an ideal liquid crystal display, the backlight provides light evenly across the entire surface. In addition, the apparatus has to meet the requirements of being small in size, light in weight, and bright enough, while having a low power consumption.

U.S. Pat. No. 5,438,484 issued to Kanda et al. discloses a surface lighting device. A variety of prior art surface lighting devices are disclosed in FIGS. 1 to 5 of the Kanda patent. The light source arrangements in the surface lighting devices of FIGS. 1 to 5 are generally referred to as "edge-type" light sources. Kanda describes the disadvantages of the prior art surface lighting devices in detail, i.e., that the surface areas closer to the light sources are brighter than the central areas. According to Kanda's explanation in the specification, "However, as described above, the surface lighting device of an edge-type has a low luminance in the central portion between the light sources and a high luminance in the vicinity of the light sources as indicated by a broken line C shown in FIG. 9. This is because the light sources 1a and 1b emit diffusion light and make the vicinity of the light sources 1a and 1b bright while the light emitted from the light sources 1a and 1b mostly reach the opposite light source 1b and 1a to be diffused, respectively, thus making the vicinity of the light sources 1a and 1b brighter. As a result, it is inevitable that the effective light range (effective emission surface) of the foregoing lighting device will become narrower because its overall luminance must be adjusted to latch evenly as a backlight with the lowered luminance between the central portion of the light sources 1a and 1b. Thus, a problem is encountered that the light utilization efficiency for the apparatus as a whole is reduced." See Column 2, lines 31 to 49.

Kanda provides a solution, as shown in FIGS. 11 to 16, by providing "a light guide configured by a plural light transmitting members joined together, so that the junction surface therebetween crosses the light emitting surface." As a result, according to Kanda, the luminance emitted from edge-type light sources is evenly distributed across the entire area.

Kanda provides another solution in FIGS. 17 to 23, typically shown in FIG. 23. In this application, the light source is arranged directly behind the diffusion board, instead of at the edge of a light guide, as shown in FIG. 1 of the Kanda patent. However, although this arrangement does provides a brighter central displaying area, it creates a problem of color chromaticity across the liquid crystal display. As explained by Kanda in Column 12, lines 19–49, Kanda then uses a "light source having preferably be more blueish than the standard color" to solve the "yellowish" problem.

Aside from use of the "blueish light source", it is noted that a "light curtain", reference numeral 14 of FIG. 22, has also been used to reduce the luminance projected toward the display area immediately in front of the light source. It should be easy to appreciate that the more parts used within the liquid crystal display, the more laborious the effort needed to assemble the display. No doubt, the size and weight of the liquid crystal display will inevitably be increased.

U.S. Pat. No. 5,881,201 issued to Khanarian discloses improved light pipes for backlighting liquid crystal display devices. The light pipes comprise transparent polymers with scattering centers. A preferred composition for such light pipes comprises a cycloolefin polymer containing scattering centers from suitable elastomers and inorganic fillers. The inventive light pipes offer superior scattering efficiency as well as spatial uniformity of scattering and uniformity of scattering across a wide wavelength range.

Referring to FIG. 7, Taiwan Utility Patent Publication No. 368081 discloses a backlight module 100 which generally includes a transparent light guide 110 with a reflective light enhancer 120 attached to a bottom surface thereof. The backlight module 100 further includes a diffusion film 130 arranged on a top surface of the light guide 110. A fluorescent light 140 is arranged at an end of the light guide 110. It can be readily appreciated that the light guide 110 is provided with a plurality of elongate printed lines 111 diverging away from the light source 140 located at the end of the light guide 110. The backlight module 100 further includes an end reflective enhancer 150 to homogeneously reflect the light beams so as to provide a uniform distribution of luminance over the light guide 110.

The diffusion film 130 functions to homogenously diffuse the light beams projected from the light source 140. However, before the light beams reach the diffusion film 130, the light beams have to travel through the light guide 110, and be reflected by the reflective light enhancer 120. It should be noted that before the light beams reach the diffusion film 130, the light beams have to first be emitted from the light guide 110, and then must enter the diffusion film 130. The light guide 110 and the diffusion film 130 have different refractive indices and surely the energy of the light beam is exhausted during the transition. In addition, the diffusion film 130 is a separate element in addition to the light guide 110, has to be manufactured separately. As such, the overall cost is inevitably increased.

SUMMARY OF INVENTION

It is an object of the present invention to provide a light guide module in which a light diffusion arrangement is deployed over a light emitting surface of light guide module so as to reduce the overall cost.

In order to achieve the object set forth, a light guide module has a light emitting surface and a light incident surface orthogonal to the light emitting surface. A light diffusion arrangement is deployed on the light emitting surface and includes organic scattering balls homogenously mixed within a bonding agent. At least a light source is arranged adjacent the light guide to project light beams into the light guide module.

DETAILED DESCRIPTION

Figure 1:
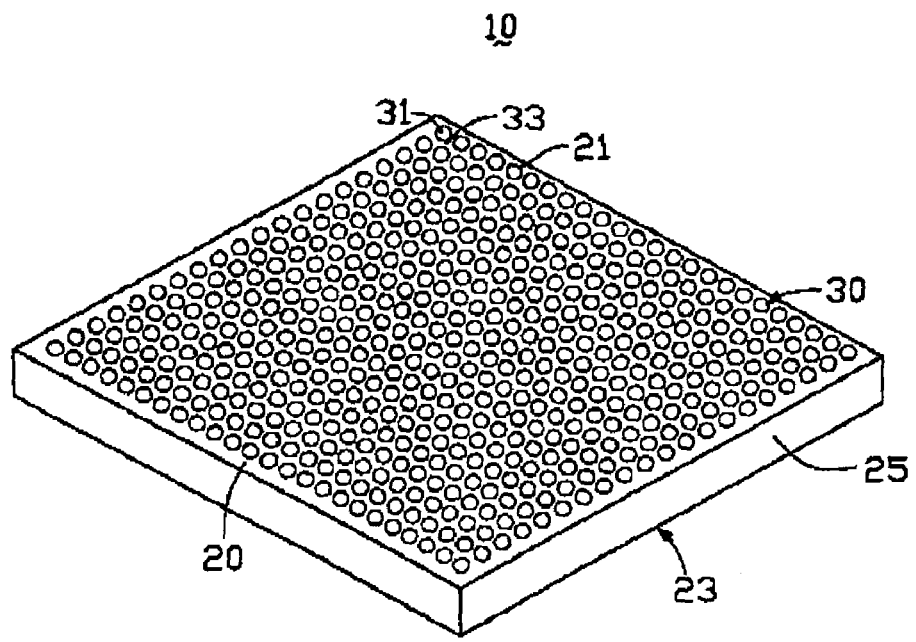
FIG. 1 is a perspective view of a light guide module in accordance with the present invention.

Referring to FIG. 1, a light guide module 10 in accordance with the present invention generally includes a light pipe 20 and a light diffusion arrangement 30. The light pipe 20 is made from transparent resin material or glass. The light pipe 20 generally includes an incident surface 25, an emitting surface 21, and a bottom surface 23 opposite to the emitting surface 21. Since the incident surface 25 is located at an end of the light pipe 20, the incident surface 25 intersects both the bottom surface 23 and the emitting surface 21.

Figure 2:
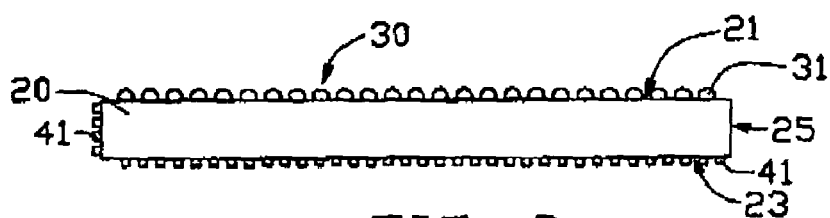
FIG. 2 is a side view of FIG. 1.
Figure 3:
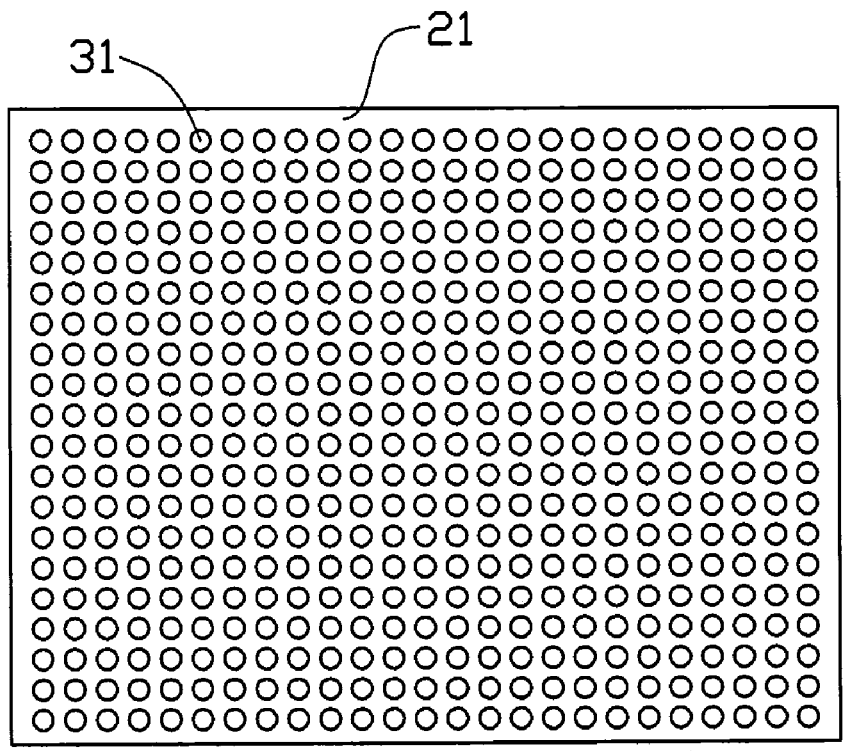
FIG. 3 is a top view of a FIG. 1.

Referring now to FIGS. 1, 2, and 3, the emitting surface 21 of the light pipe 20 has the light diffusion arrangement 30. The light diffusion arrangement 30 comprises a plurality of organic scattering balls 31 mixed with bonding agent 33 so as to evenly distribute luminance across the emitting surface 21. The organic scattering balls 31 are evenly mixed within the bonding agent 33 and the mixture is then spread uniformly over the emitting surface 21 of the light pipe 20. Material for making the organic scattering balls 31 can be selected from Polymethyl Methacrylate, Polycarbonate, and Methallocene Cyclic Olefin Copolymer having a grain size ranging from 10–15 mlcrometers. The bonding agent 33 is selected from acrylic adhesives.

Figure 4:
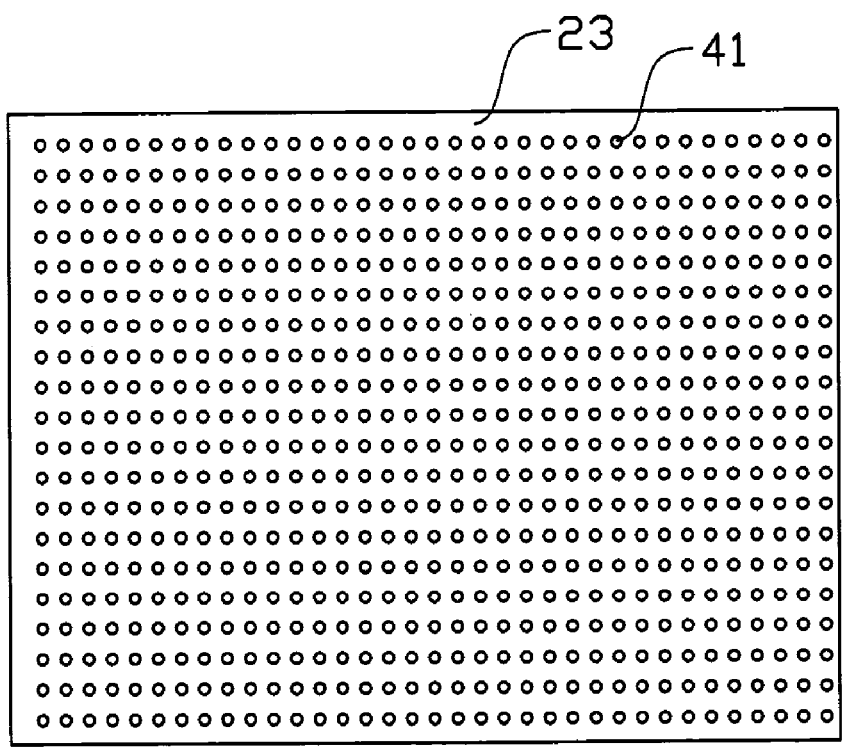
FIG. 4 is a bottom view of FIG. 1.

Now referring to FIG. 4, together with FIGS. 1 and 2, the light pipe 20 in accordance with the present invention further includes a dot-web 41 evenly distributed over the bottom surface 23 of the light pipe 20. The dot-web 41 is made from highly refractive diffusion material so as to effectively refract and diffuse the light beams traveling within the light pipe 20 after the light beams enter the light pipe 20 from the incident surface 25. The use of the dot-web 41 can prevent total-reflection of the light within the light pipe 20.

As stated above, the use of the organic scattering balls 31 can effectively diffuse the light beams emitted from the emitting surface 21 so as to provide an evenly distributed luminance across the emitting surface 21. In addition, each of the scattering balls 31 has a limited surface contact with the emitting surface 21. As a result, the light losses resulting from the scattering balls can be controlled to with a certain limit. Accordingly, the overall optical characteristics of the light pipe 20 are enhanced.

Figure 5:
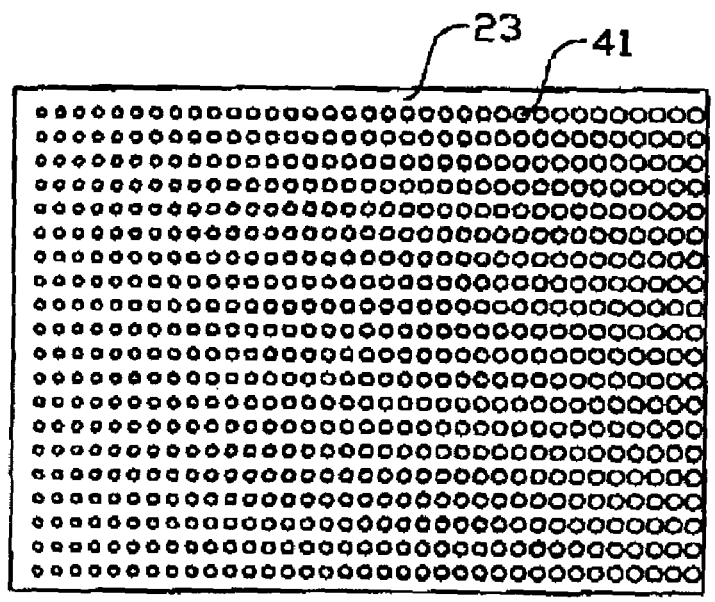
FIG. 5 is a bottom view of the light guide module of FIG. 1, but with an alternative dot-web.

It should be readily appreciated that the light pipe 20 can be embodied in a variety of forms. For example, a cross section of the light pipe can be a trapezoid configuration. In addition, the dot-web 41 can be arranged in different patterns based on its grain size and density. Typicahy, the grain size and density of the dot-web 41 can be increased in proportion to a distance from the incident surface 25, as shown in FIG. 5. When the dot-web 41 is varied, the grain size and density of the scattering balls can also be changed accordingly. The incident surface 25 of the light pipe 24 can also be arranged with respect to the emitting surface 21. Moreover, the dot-web 41 can be further formed on a surface (not labeled) of the light pipe 20 opposite to the light incident surface 25.

Figure 6:
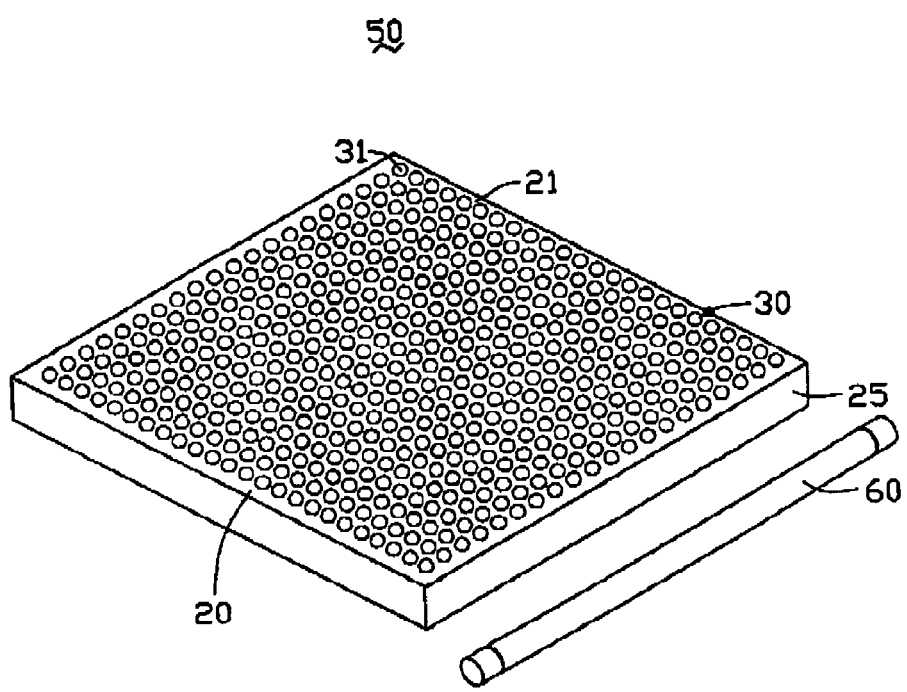
FIG. 6 is an exploded view of the light guide module of FIG. 1 together with a light source in accordance with the present invention.
Figure 7:
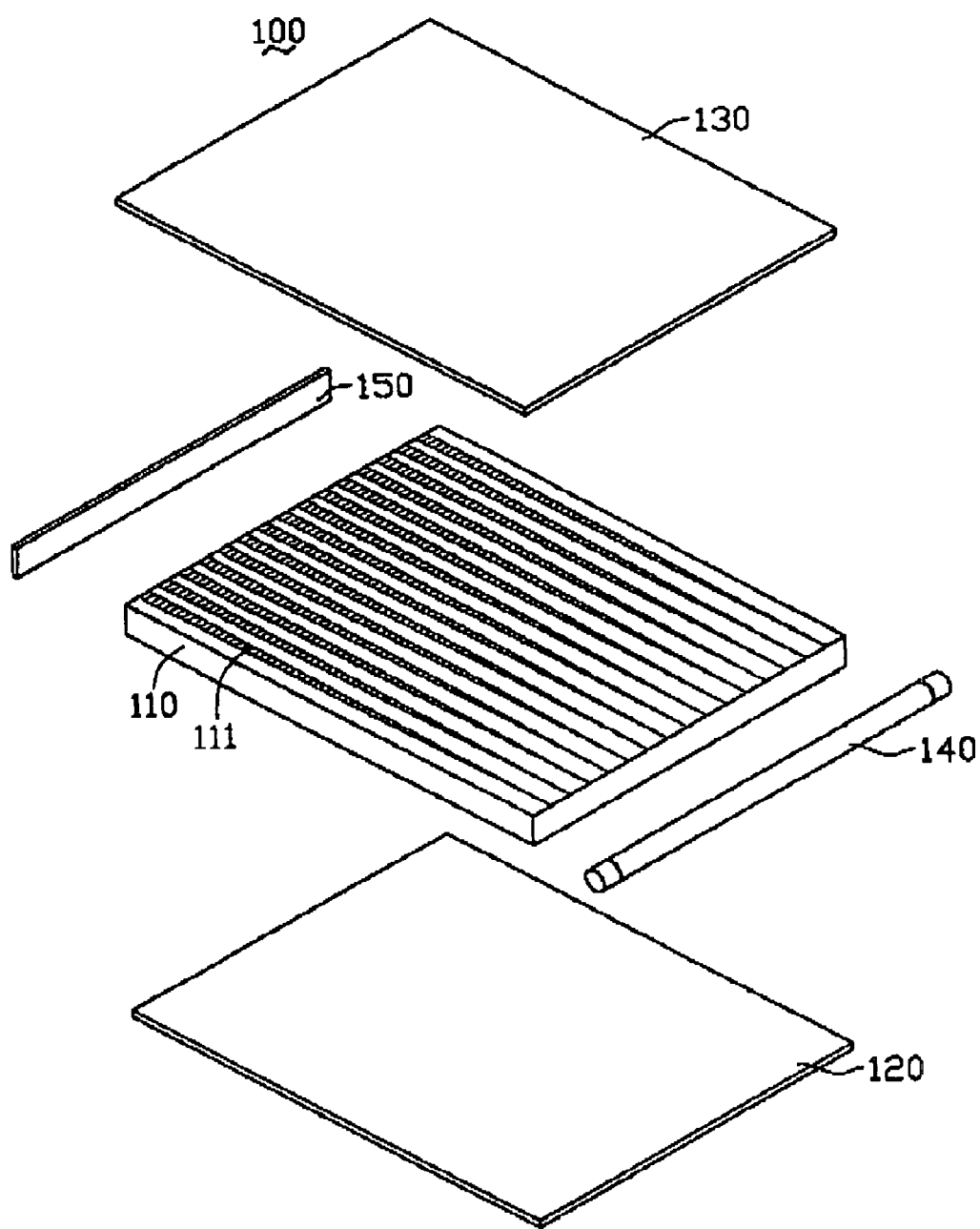
FIG. 7 is an exploded view of a prior art backlight module.

Referring to FIG. 6, the backlight module 50 includes a light source 60 and a light guide module 10 as discussed above. The light source 60 is arranged adjacent to the incident surface 25 of the light pipe 20. The light source 60 projects light beams into the light pipe 20 through the incident surface 25, which beams travel within the light pipe 20. Finally, the light beams are emitted from the light emitting surface 21 after they are diffused by the light diffusion arrangement 30.

The light diffusion arrangement 30 made according to the present invention adequately addresses the prior art issue and provides a simple implementation over the light guide emitting surface 21 featuring less energy loss and brighter luminance.

Alternatively, a backlight module 50 can be embodied with two light sources 60 arranged adjacent two opposite ends (incident surfaces). When the second light source 60 is introduced, the overall luminance is further enhanced. In alternative embodiments, prism plates can be arranged adjacent to the light emitting surface 21 and/or the bottom surface 23.

The light guide module according to the present invention is made by the following steps, a) providing a light pipe 20 made from a dynthetic resin or glass; b) providing a mixture fully blended of the scattering balls 31 and bonding agent 33; c) deploying a layer of the mixture over an emitting surface 21 of the light pipe. The grain size of the scattering balls range from 10–50 micrometers, and material of the scattering balls selected from Polymethyl Methacrylate, Polycarbonate, and Methallocene Cyclic Olefin Copolymer. The method further comprises a step of forming a dot-web across the bottom surface of the light guide.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

The invention claimed is:

1. A light guide module for a backlight module, comprising:
   a light guide pipe having a light emitting surface, and a light incident surface orthogonal to the light emitting surface;
   a dot-web located on a surface of the light guide pipe opposite to the light emitting surface and on a surface of the light guide pipe opposite to the light incident surface; and
   a light diffusion arrangement deployed on the light emitting surface, the light diffusion arrangement including organic scattering balls homogenously mixed within a bonding agent.

2. The light guide module as recited in claim 1, wherein a grain size of the organic scattering balls ranges from 10 to 15 micrometers.

3. The light guide module as recited In claim 1, wherein a material of the organic scattering balls comprises items selected from the group consisting of Polymethyl Methacrylate, Polycarbonate, and Methallocene Cyclic Olefin Copolymer.

4. The light guide module as recited in claim 1, wherein the bonding agent is acrylic bonding agent.

5. The light guide module as recited in claim 1, wherein the scattering balls are homogenously distributed over the light emitting surface.

6. The light guide module as recited in claim 1, wherein a density of the scattering balls becomes greater as a distance from the incident surface becomes greater.

7. The light guide module as recited in claim 1, wherein a density of the dot-web increases as a distance from the light incident surface increases.

8. The light guide module as recited in claim 1, wherein the light incident surface and the light emitting surface are arranged to adjoin one another.

9. A backlight module, comprising:
- a light pipe module having a light emitting surface, and a light incident surface angled with regard to the light emitting surface;
- a dot-web located on a surface of the light pipe module opposite to the light emitting surface and on a surface of the light pipe module opposite to the light incident surface;
- a light diffusion arrangement integrally formed on the light emitting surface, the light diffusion arrangement including organic scattering balls homogenously mixed within a bonding agent; and
- at least a light source arranged adjacent the light incident surface.

10. The backlight module as recited in claim 9, wherein the dot-web formed on the surface of the light pipe module opposite to the light emitting surface is made from highly refractive diffusion material.

11. A method for making a light guide module, comprising the steps of:
- providing a light pipe comprising a light incident surface and a light emitting surface, and further comprising a dot-web located on a surface opposite to the light emitting surface and on a surface opposite to the light incident surface;
- providing organic scattering balls mixed with bonding agent to form a mixture; and
- spreading the mixture over the light emitting surface of the light pipe.

12. The method as recited in claim 11, further comprising the step of forming a dot-web arrangement over a different surface of the light pipe.

* * * * *